United States Patent
Fujii et al.

(10) Patent No.: US 7,710,406 B2
(45) Date of Patent: May 4, 2010

(54) TOUCH PANEL

(75) Inventors: Shoji Fujii, Osaka (JP); Koji Tanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 695 days.

(21) Appl. No.: 11/649,207

(22) Filed: Jan. 4, 2007

(65) Prior Publication Data
US 2007/0182720 A1 Aug. 9, 2007

(30) Foreign Application Priority Data
Feb. 7, 2006 (JP) .............................. 2006-029364

(51) Int. Cl.
G09G 5/00 (2006.01)
(52) U.S. Cl. ..................... 345/173; 345/174; 439/66; 439/77; 439/260
(58) Field of Classification Search ......... 345/173–178; 178/18.03–18.07; 439/67, 77, 260, 447, 439/458; 349/58, 150
See application file for complete search history.

(56) References Cited

U.S. PATENT DOCUMENTS

| | | | |
|---|---|---|---|
| 5,193,668 A | 3/1993 | Fukuchi et al. | |
| 5,750,940 A | 5/1998 | Ito et al. | |
| 6,259,491 B1 | 7/2001 | Ekedahl et al. | |
| 7,108,515 B2 * | 9/2006 | Tanabe et al. | 439/67 |
| 7,227,537 B2 * | 6/2007 | Nakayama et al. | 345/173 |
| 7,538,288 B1 * | 5/2009 | Huang | 200/512 |
| 2004/0051699 A1 | 3/2004 | Tanabe et al. | |

FOREIGN PATENT DOCUMENTS

| | | |
|---|---|---|
| JP | 9-146680 | 6/1997 |
| JP | 11-316650 | 11/1999 |
| JP | 2003-58319 | 2/2003 |
| WO | WO 03/017081 A1 | 2/2003 |

* cited by examiner

Primary Examiner—Richard Hjerpe
Assistant Examiner—Jennifer T Nguyen
(74) Attorney, Agent, or Firm—McDermott Will & Emery LLP

(57) ABSTRACT

A touch panel includes a first substrate, a second substrate, a wiring substrate provided with a plurality of wiring patterns formed thereon, and an anisotropic conductive adhesive layer. The first substrate has a first conductive layer and first electrodes extending from two opposite sides of the first conductive layer. The second substrate has a second conductive layer confronting the first surface with a space, and second electrodes extending from two opposite sides of the second conductive layer. The anisotropic conductive adhesive layer connects a terminal portion of the wiring patterns to at least one of the first electrodes and the second electrodes. The wiring substrate has a slit or an aperture between the wiring patterns at one end thereof. The touch panel of this structure is easy to produce, and provides reliable operation and electrical connection and separation.

4 Claims, 6 Drawing Sheets

TOUCH PANEL

BACKGROUND OF THE INVENTION

1. Field of the Invention

The present invention relates to a touch panel used to operate a variety of electronic apparatuses.

2. Background Art

Following the advancement in recent years of various electronic apparatuses such as mobile phones, car navigation systems and the like toward high performance and diversification, there is a continuous growth in number of the electronic apparatuses equipped with optically transparent touch panels in front of their display devices such as liquid crystal panels. A user of any such electronic apparatus operates it by pressing a touch panel with a finger, a pen, or the like tool while visually observing through the touch panel a screen on the display device provided behind the touch panel. Operation of the electronic apparatus is switched in this manner from one function to another. A demand thus exists for such touch panels that are superior in visibility and reliable in operation.

With reference to FIG. 8 and FIG. 9, description is provided of a conventional touch panel.

FIG. 8 is a plan view of a conventional touch panel, and FIG. 9 is a sectional view of a main portion of the conventional touch panel. In FIG. 8 and FIG. 9, there are film-like upper substrate 101 having optical transparency, and lower substrate 102 also having optical transparency placed under upper substrate 101. Upper substrate 101 is provided with upper conductive layer 103 having optical transparency made from a material such as indium tin oxide, and formed on a back surface thereof. Lower substrate 102 is also provided with lower conductive layer 104 having optical transparency made from the material such as indium tin oxide, and formed in the same manner on a front surface thereof.

A plurality of dot spacers (not shown in the figures) is formed of an insulation resin at predetermined intervals on a front surface of lower conductive layer 104. There is a pair of upper electrodes 105 formed at two opposite sides of upper conductive layer 103. There is also a pair of lower electrodes 106 formed at two opposite sides of lower conductive layer 104 in a direction orthogonal to upper electrodes 105. Both upper electrodes 105 and lower electrodes 106 are made of an electrically conductive material such as silver.

In addition, spacer 107 of generally a frame-like shape is formed on either a lower peripheral surface of upper substrate 101 or an upper peripheral surface of lower substrate 102. Spacer 107 is provided with adhesive layers (not shown) coated on both a front surface and a back surface. Upper substrate 101 and lower substrate 102 are bonded at their peripheries with these adhesive layers, so that they face each other at a given space between them. Upper electrodes 105 and lower electrodes 106 are so formed that their terminal portions extend to one side of upper substrate 101 and lower substrate 102.

Wiring substrate 108 of a film-like form has a plurality of upper wiring patterns 109 (hereinafter referred to as patterns 109) formed on its front surface and a plurality of lower wiring patterns 110 (referred to as patterns 110) formed on its back surface. All of patterns 109 and 110 are made of an electrically conductive material such as silver, and constitute a plurality of wiring patterns. Both the front and the back surfaces of wiring substrate 108 is coated additionally with an insulation layer (not shown) to cover patterns 109 and 110. The insulating layer is not provided, however, on a terminal portion of wiring substrate 108, where connection is made to touch panel 100 and an electronic circuit (not shown) of an electronic apparatus. The terminal portion of wiring substrate 108 is placed and held in a position between upper substrate 101 and lower substrate 102.

Anisotropic conductive adhesive layer 111 (referred to as adhesive layer 111) contain a large number of electrically conductive particles 111b distributed in synthetic resin 111a. Adhesive layer 111 is used to bond and secures the terminal portion of wiring substrate 108 to upper substrate 101 and lower substrate 102. Upper electrodes 105 and terminal portion of patterns 109 are thus connected electrically through conductive particles 111b. Likewise, lower electrodes 106 and terminal portion of patterns 110 are connected electrically through conductive particles 111b. Touch panel 100 is thus constructed as described above.

Touch panel 100 constructed in this manner is placed in front of a liquid crystal display device or the like (not shown), and mounted to an electronic apparatus. In addition, the terminal portions of patterns 109 and 110 on wiring substrate 108 are connected to an electronic circuit of the electronic apparatus by such means as a connector and soldering.

In the structure discussed above, a front surface of upper substrate 101 is pressed to operate with a finger, a pen or the like tool while allowing visual observation of a screen on the liquid crystal display device provided on a back side of touch panel 100. This causes upper substrate 101 to deform, and upper conductive layer 103 to come in contact with lower conductive layer 104 at a position being pressed.

Voltages are applied successively from the electronic circuit to upper electrodes 105 through patterns 109 and to lower electrodes 106 through patterns 110 respectively. The electronic circuit detects the pressed position large number of conductive particles 111b link up across these electrodes. Such a phenomenon of short-circuiting, if occurs, may impair the electrical insulation between the electrodes or the wiring patterns, thereby resulting in instability of electrical connection and separation or operation of touch panel 100.

It is conceivable to reduce an amount of conductive particles 111b distributed in synthetic resin 111a in order to prevent short-circuiting between the electrodes or the wiring patterns attributable to development of aggregated portion 111C. When the added amount of conductive particles 111b is reduced, however, it becomes inevitable to lead instability in the electrical connections between upper electrodes 105 and patterns 109 as well as the electrical connections between lower electrodes 106 and patterns 110 through conductive particles 111b.

It is for this reason to make adjustment of a size and amount of conductive particles 111b mixed in synthetic resin 111a, or conditions of the heating temperature and pressure used for thermal compression of adhesive layer 111. It may also become necessary that the anisotropic conductive adhesive is stirred thoroughly before it is applied to form adhesive layer 111, or adhesive layer 111 are inspected for presence of aggregated portion 111C. Any of the above makes the process of manufacturing touch panels 100 complicated.

Japanese Patent Unexamined Publication, No. 2003-58319, for instance, discloses conventional touch panel 100 of the kind discussed above.

SUMMARY OF THE INVENTION

Provided is a touch panel, which does not require adjustment of a size and amount of electrically conductive particles contained in an anisotropic conductive adhesive, or thorough stirring of the same before it is applied to form anisotropic conductive adhesive layer, and therefore it is easy to produce and based on a voltage ratio of upper electrodes 105 and another voltage ratio of lower electrodes 106, and it switches various functions of the electronic apparatus accordingly.

In a process of manufacturing touch panel 100 of this kind, upper substrate 101 and lower substrate 102 of generally the same size are bonded together by using spacer 107, as a first step. Following the above, the terminal portion of wiring substrate 108 is placed and secured between the side of upper substrate 101 and the side of lower substrate 102, where terminal portions of upper electrodes 105 and lower electrodes 106 extend. In this way, the substrates are positioned in a manner so that the plurality of patterns 109 and 110 overlaps with the plurality of upper electrodes 105 and the plurality of lower electrodes 106.

The secured area at the terminal portion of wiring substrate 108 is then heated and pressed over the front surface of upper substrate 101 and the back surface of lower substrate 102 by using a jig or the like tooling. This process softens adhesive layer 111 coated on the terminal portion of any of the back surface of upper substrate 101, front surface of lower substrate 102 and wiring substrate 108. Adhesive layer 111 hardens thereafter to bond and connect the upper electrodes 105 and the terminal portion of patterns 109. The hardened adhesive layer 111 also bond and connect lower electrodes 106 and the terminal portion of patterns 110. Touch panel 100 connected with wiring substrate 108 is hence manufactured.

There is a possibility, however, that the above process develops aggregated portion 111C, where conductive particles 111b gather densely inside any of adhesive layer 111 across the plurality of electrodes 105 or the plurality of patterns 109, as shown in FIG. 9. Aggregated portion 111C may short-circuit between the plurality of electrodes 105 or the plurality of patterns 109 when a inspected.

The touch panel of the present invention includes a first substrate of optical transparency, a second substrate of optical transparency, a wiring substrate, and an anisotropic conductive adhesive layer. The first substrate has a first surface, a first conductive layer formed at the first surface, and first electrodes formed in a manner to extend from two opposite sides of the first conductive layer. The second substrate has a second surface, a second conductive layer formed at the second surface in a manner to confront the first surface with a space, and second electrodes formed in a manner to extend from two opposite sides of the second conductive layer in a direction orthogonal to two opposite sides of the first conductive layer at which first electrodes formed. The wiring substrate has a third surface, a fourth surface, and a plurality of wiring patterns formed on at least one of the third surface and the fourth surface. The anisotropic conductive adhesive layer connects a terminal portion of the wiring patterns to at least one of the first electrodes and the second electrodes. The wiring substrate is provided with any of a slit and an aperture between the wiring patterns formed at one end thereof. This structure provides the touch panel which is easy to produce while it also ensures reliable operation and electrical connection and separation.

DETAILED DESCRIPTION OF THE INVENTION

Description is provided hereinafter of an exemplary embodiment of the present invention with reference to FIG. 1 to FIG. 7.

Exemplary Embodiment

Figure 1:
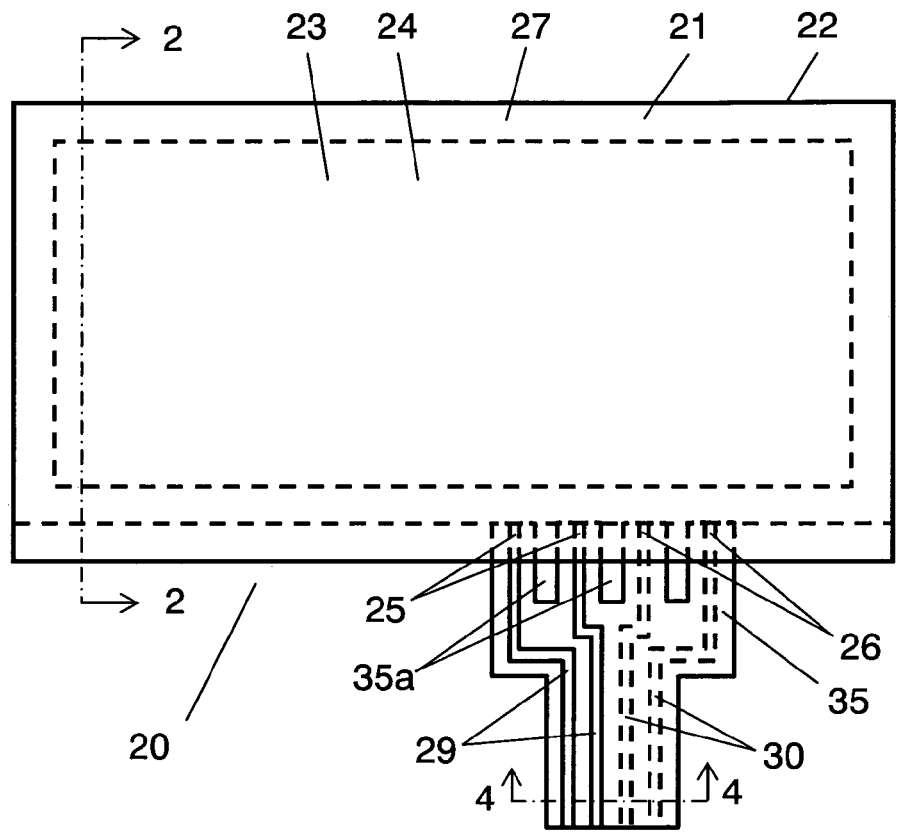
FIG. 1 is a plan view of a touch panel according to an exemplary embodiment of the present invention.
Figure 2:
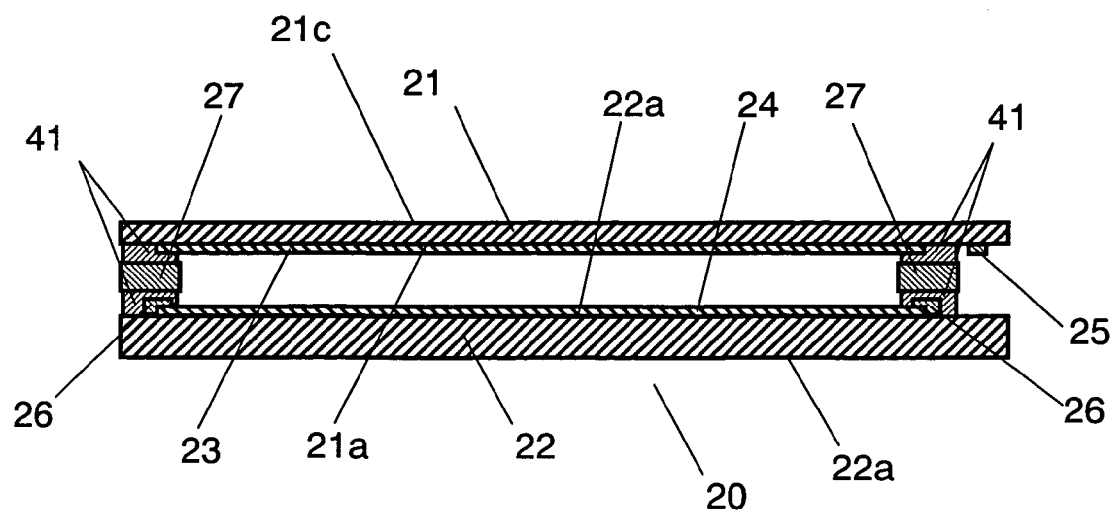
FIG. 2 is a sectional view of a cross section taken along the line 2-2 of the touch panel shown in FIG. 1.
Figure 3A:
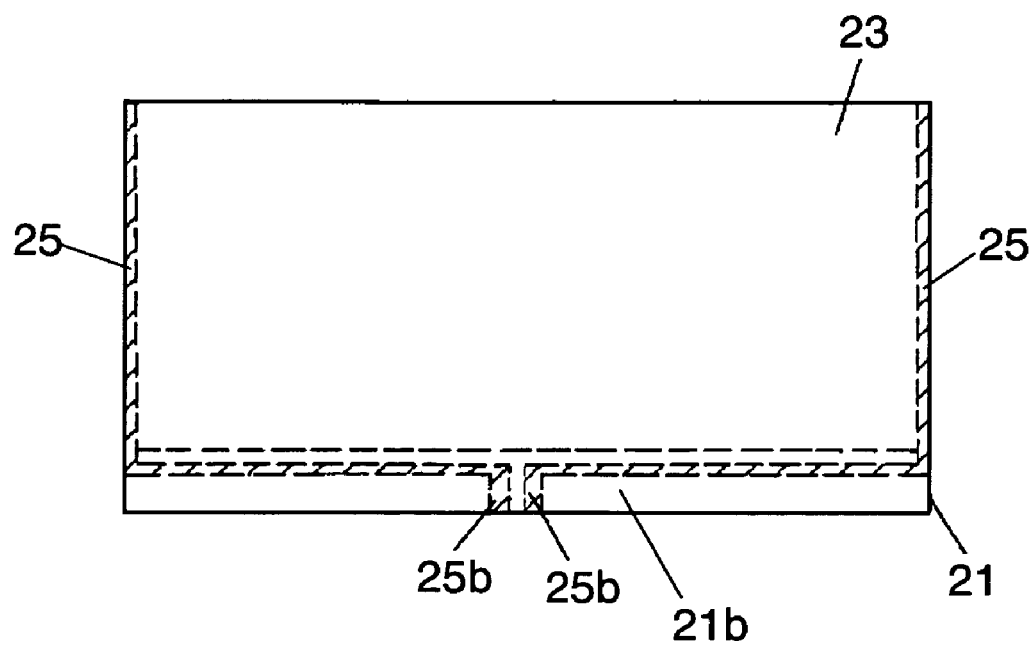
FIG. 3A is a plan view of a first substrate used for the touch panel shown in FIG. 1.
Figure 3B:
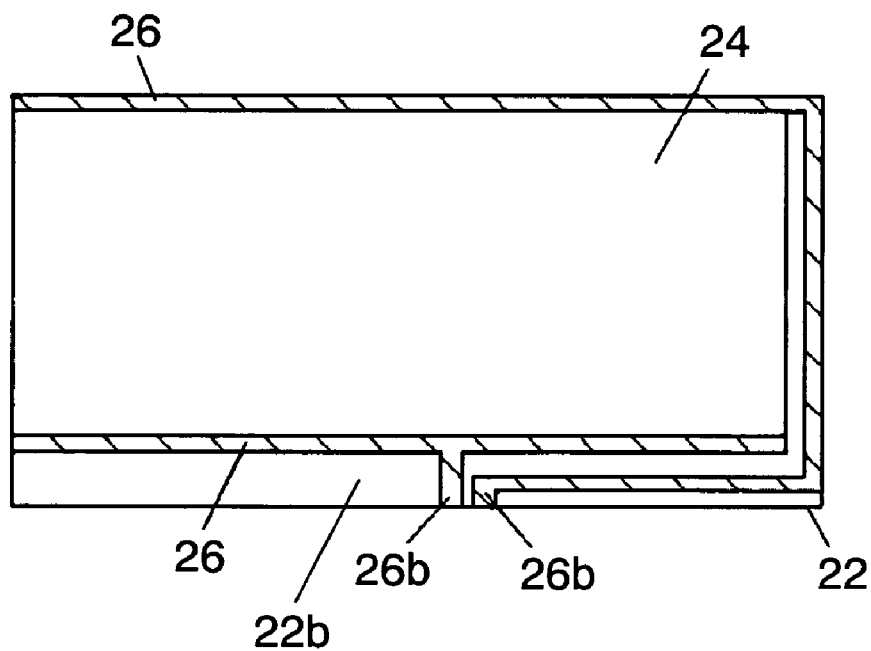
FIG. 3B is a plan view of a second substrate used for the touch panel shown in FIG. 1.
Figure 4:
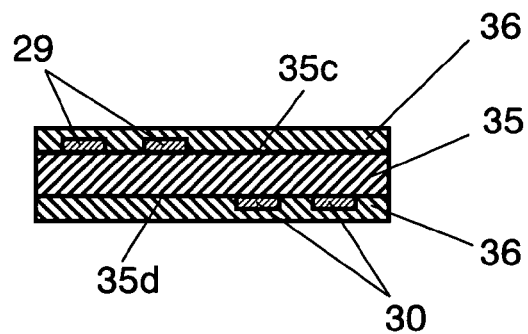
FIG. 4 is a sectional view of a cross section taken along the line 4-4 of the touch panel shown in FIG. 1.
Figure 5:
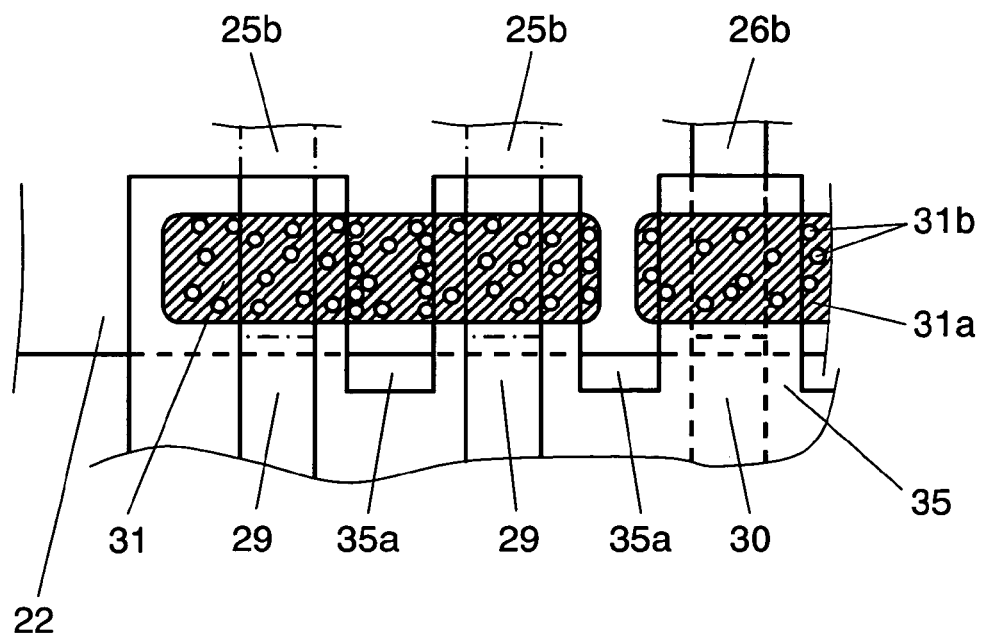
FIG. 5 is a cutaway view of a main portion of the touch panel shown in FIG. 1.
Figure 6A:
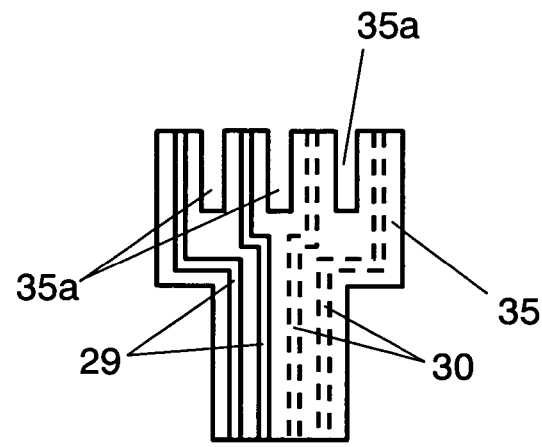
FIG. 6A is a plan view of a wiring substrate used for the touch panel shown in FIG. 1.

FIG. 1 is a plan view of a touch panel according to an exemplary embodiment of the present invention. FIG. 2 is a sectional view of a cross section taken along the line 2-2 of the touch panel shown in FIG. 1. FIG. 3A is a plan view of a first substrate used for the touch panel shown in FIG. 1. FIG. 3B is a plan view of a second substrate used for the touch panel shown in FIG. 1. FIG. 4 is a sectional view of a cross section taken along the line 4-4 of the touch panel shown in FIG. 1. FIG. 5 is a cutaway view of a main portion of the touch panel shown in FIG. 1. FIG. 6A is a plan view of a wiring substrate used for the touch panel shown in FIG. 1.

In FIG. 1 to FIG. 6A, an upper substrate defining first substrate 21 (hereafter referred to as substrate 21) has a film-like form and optical transparency, and it is formed of an optically isotropic material such as polyethylene terephthalate and polycarbonate resin. A lower substrate defining second substrate 22 (referred to as substrate 22) is formed of an optically isotropic material such as glass, acrylic resin and polycarbonate resin, and it is also optically transparent. Substrate 21 has optically transparent first conductive layer 23 (referred to as layer 23) serving as an upper conductive layer formed on its back surface defining first surface 21a (referred to as surface 21a). Substrate 22 has optically transparent second conductive layer 24 (referred to as layer 24) serving as a lower conductive layer formed on its front surface defining second surface 22a (referred to as surface 22a). Both layers 23 and 24 are formed from a material such as indium tin oxide and tin oxide by such means as the sputtering method.

A plurality of dot spacers (not shown) is formed of an insulation resin such as epoxy resin and silicone resin at predetermined intervals on layer 24. There is a pair of upper electrodes defining first electrodes 25 (referred to as electrodes 25) formed at two opposite sides of layer 23. There is also a pair of lower electrodes defining second electrodes 26 (referred to as electrodes 26) formed at two opposite sides of layer 24 in a direction orthogonal to upper electrodes 25. In other words, electrodes 26 are formed at the two opposite sides of layer 24 in the direction orthogonal to the two opposite sides of layer 23 at which electrodes 25 are formed. Both electrodes 25 and 26 are formed of an electrically conductive material such as silver and carbon.

In addition, spacer 27 of substantially a frame-like shape is formed on either a periphery of surface 21a of substrate 21 or a periphery of surface 22a of substrate 22. Spacer 27 is formed of a material such as unwoven cloth and polyester film. Substrates 21 and 22 are bonded at their peripheries with adhesive layer 41, which is formed of a material such as acrylic resin and rubber, coated on both a front surface and a back surface of spacer 27. Layers 23 and 24 are hence arranged in a manner to confront each other at a given space. In this embodiment, the frame-like shape means a configuration of a framework having only an outer part of a polygonal shape such as quadrangle.

Terminal portions 25b of electrodes 25 is extended to side edge 21b of substrate 21 and terminal portions 26b of electrodes 26 is extended to side edge 22b of substrate 22, respectively.

Wiring substrate 35 (referred to as substrate 35) of a film-like form is made of a material such as polyethylene terephthalate and polycarbonate resin. Substrate 35 has a plurality of upper wiring patterns 29 (patterns 29) formed on a front surface defining third surface 35c (referred to as surface 35c). Substrate 35 also has a plurality of lower wiring patterns 30 (referred to as patterns 30) on a back surface defining fourth surface 35d (referred to as surface 35d). All of patterns 29 and 30 are made of an electrically conductive material such as silver, carbon and copper, and constitute a plurality of wiring patterns. Both surfaces 35c and 35d of substrate 35 are provided further with insulation layer 36 to cover patterns 29 and 30. Insulating layer 36 is not formed, however, in an area (not shown) around a terminal portion of substrate 35 for connection to touch panel 20 and an electronic circuit (not shown) of an electronic apparatus (not shown).

Substrate 35 is provided with slits 35a formed between individual patterns 29 and 30 at one end thereof. The end of substrate 35 where slits 35a are provided is placed and secured in position between substrates 21 and 22.

Anisotropic conductive adhesive layer 31 (hereafter referred to as adhesive layer 31) contain a large number of electrically conductive particles 31b distributed in synthetic resin 31a. Synthetic resin 31a is made of a material such as epoxy resin, acrylic resin and polyester resin. Electrically conductive particles 31b are composed of nickel or resin particles with gold-plated surfaces, and their particle diameters range from 2 to 15 μm. Adhesive layer 31 is used to bond and secure the terminal portion of substrate 35 to substrates 21 and 22. In addition, terminal portions 25b of electrodes 25 and terminal portions of patterns 29 are electrically connected with conductive particles 31b. Likewise, terminal portions 26b of electrodes 26 and terminal portions of patterns 30 are electrically connected with conductive particles 31b. Touch panel 20 is hence constructed in this manner.

In a process of manufacturing touch panel 20 of this kind, substrates 21 and 22 of substantially the same size are bonded together by using spacer 27, as a first step. Following the above, the terminal portion of substrate 35 is placed and secured between side edge 21b of substrate 21 and side edge 22b of substrate 22, where terminal portions 25b of electrodes 25 and terminal portions 26b of electrodes 26 extend respectively. The plurality of patterns 29 is thus positioned in an overlapping manner with the plurality of terminal portions 25b. Likewise, the plurality of patterns 30 is positioned in the overlapping manner with the plurality of terminal portions 26b. In this case, adhesive layer 31 are coated on any of the terminal portions of surface 21a of substrate 21, surface 22a of substrate 22, and substrate 35.

The secured area at the terminal portion of substrate 35 is then heated and pressed over front surface 21c of substrate 21 and back surface 22c of substrate 22 by using a jig or the like tooling. This process softens adhesive layer 31 coated on any of the terminal portions of surface 21a, surface 22a and substrate 35. Adhesive layer 31 is cooled thereafter so that hardened adhesive layer 31 bonds and connects terminal portions 25b and the terminal portions of patterns 29. Adhesive layer 31 also bonds and connects terminal portions 26b and the terminal portions of patterns 30. Touch panel 20 connected with substrate 35 is hence manufactured.

Substrate 35 is provided with slits 35a between individual patterns 29 and 30 formed at one end thereof, as shown in FIG. 5 and FIG. 6A. This makes it unlikely for a large number of conductive particles 31b to aggregate across the electrodes at the terminal portion of substrate 35, which is bonded and secured between substrates 21 and 22 with thermally compressed adhesive layer 31, thereby preventing development of an aggregated portion of conductive particles 31b that causes short-circuiting between any of electrodes 25, 26 and patterns 29 and 30.

In other words, slits 35a are cut individually between patterns 29 and 30 at the end of substrate 35. This structure makes possible to comparatively easily produce touch panel 20 having no short circuit between electrodes 25, 26 and patterns 29 and 30 even if there are variations of a certain extent in the size and amount of conductive particles 31b distributed in synthetic resin 31a. It also makes possible to comparatively easily produce touch panel 20 having no short circuit between electrodes 25, 26 and patterns 29 and 30 even when there are variations of a certain extent in the bonding conditions such as the heating temperature and pressure during the process of bonding and connecting substrate 35 to substrates 21 and 22, Moreover, the structure allows a large amount of conductive particles 31b distributed in synthetic resin 31a, since it can prevent conductive particles 31b from developing the aggregated portion. This can provide stable electrical connections between individual electrodes 25 and patterns 29 through conductive particles 31b. Likewise, it provides stable electrical connections between individual electrodes 26 and patterns 30.

Touch panel 20 constructed in this manner is placed in front of a liquid crystal display device or the like (not shown), and mounted to the electronic apparatus. In addition, the terminal portions of patterns 29 and 30 on substrate 35 are connected to the electronic circuit of the electronic apparatus by such means as a connector and soldering.

In the structure discussed above, a user of the electronic apparatus presses to operate front surface 21c of substrate 21 with a finger, a pen or the like tool while visually observing a screen on the liquid crystal display device provided on a back of touch panel 20. This causes substrate 21 to deform, and layer 23 to come in contact with layer 24 at a position being pressed.

Voltages are applied successively from the electronic circuit to electrodes through patterns 29 and to electrodes 26 through patterns 30 respectively. The electronic circuit detects the pressed position based on a voltage ratio of electrodes 25 and another voltage ratio of electrodes 26, and it switches various functions of the electronic apparatus accordingly.

According to this exemplary embodiment, as described, patterns 29 and at the end of substrate 35 are connected to the individual terminal portions 25b and 26b of electrodes 25 and 26. There are slits 35a provided between patterns 29 and 30 at the end of substrate 35. This structure reduces development of the aggregated portions where a large number of conductive particles 31b gather in adhesive layer 31 to cause short-circuiting across the individual electrodes 25 and 26, and patterns 29 and 30 during the process of bonding and connecting substrate 35 with substrates 21 and 22. As a result, the structure provides touch panel 20, which is easy to produce while it ensures reliable operation and electrical connection and separation.

Figure 6B:
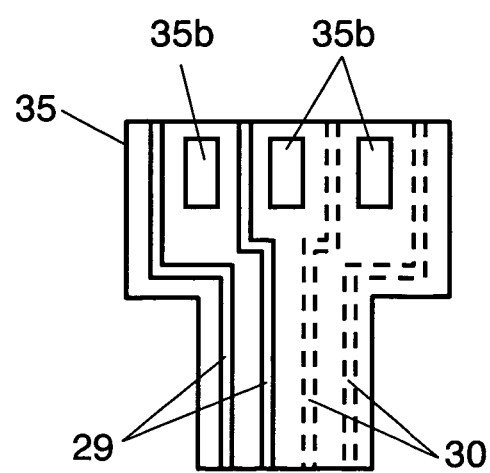
FIG. 6B is a plan view of another mode of the wiring substrate used for the touch panel shown in FIG. 1.

In the above embodiment, description was given of the structure provided with slits 35a in the spaces between patterns 29 and 30 at the end of substrate 35. Like advantages can be achieved, however, by adopting a structure, in which apertures 35b are formed in the spaces between patterns 29 and 30 at the end of substrate 35, as shown in FIG. 6B.

Figure 7A:
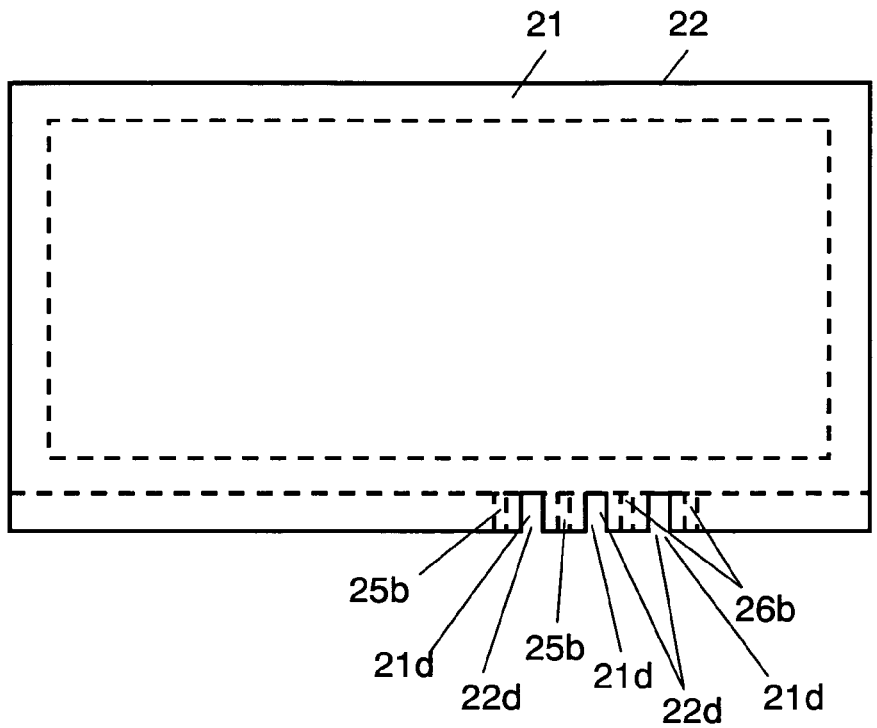
FIG. 7A is a plan view of another mode of the first substrate and the second substrate used for the touch panel of the present invention.
Figure 7B:
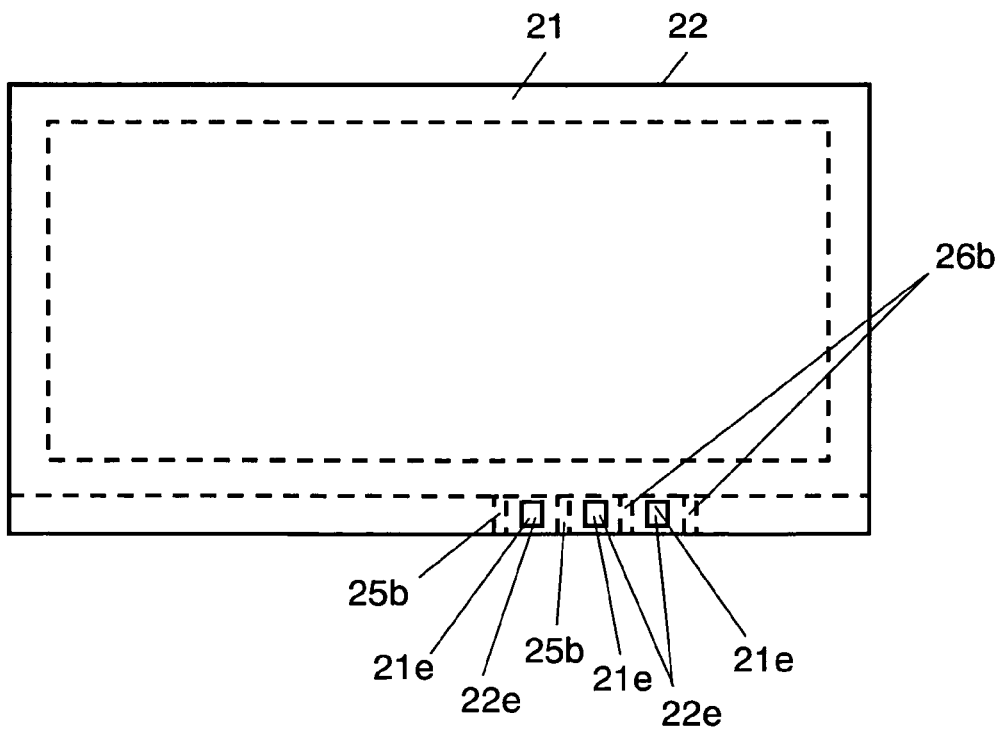
FIG. 7B is a plan view of still another mode of the first substrate and the second substrate used for the touch panel of the present invention.
Figure 8:
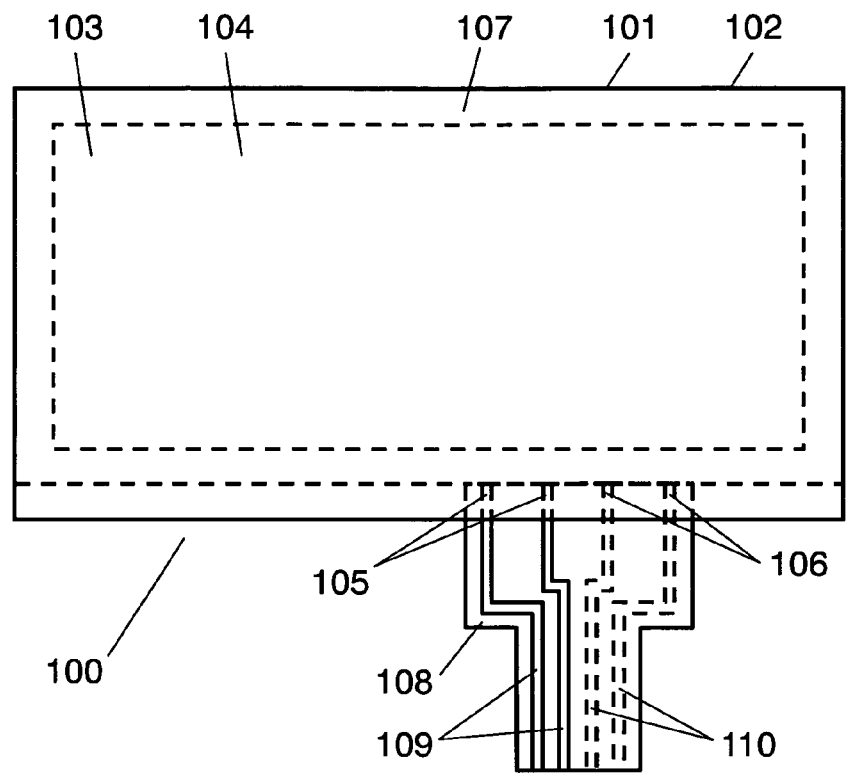
FIG. 8 is a plan view of a conventional touch panel.
Figure 9:
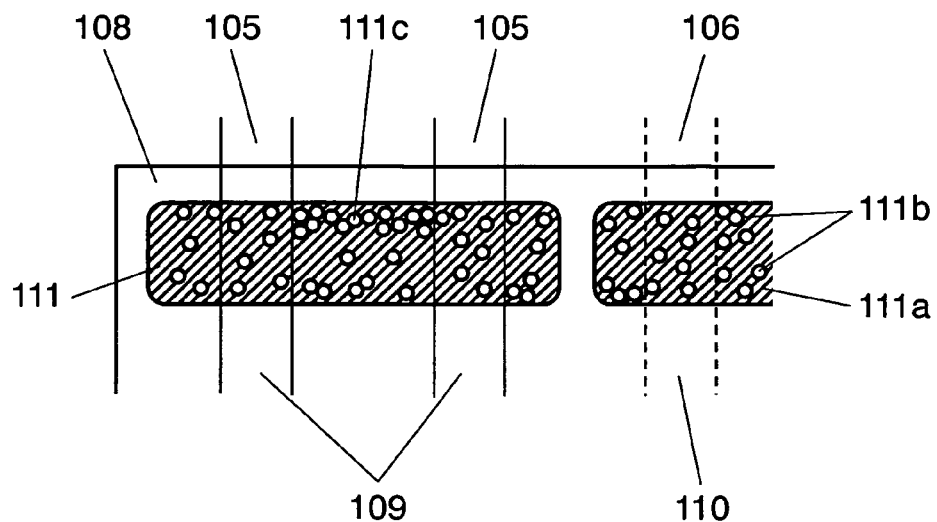
FIG. 9 is a sectional view of a main portion of the conventional touch panel.

FIG. 7A and FIG. 7B are plan views showing different modes of first substrate 21 and second substrate 22 for use in touch panel 20. A structure shown in FIG. 7A has slits 21d in spaces between terminal portions 25b of electrodes 25 formed at side edge 21b, and slits 22d in spaces between terminal portions 26b of electrodes 26 formed at side edge 22b. This structure also achieves the like advantages as the above. On the other hand, a structure shown in FIG. 7B has apertures 21e in the spaces between terminal portions 25b of electrodes 25 formed at side edge 21b, and apertures 22e in the spaces between terminal portions 26b of electrodes 26 formed at side edge 22b. Again, the like advantages are achievable with this structure.

The description provided above is the structure, in which wiring substrate 35 has patterns 29 and 30 formed on both of surfaces 35c and 35d. However, the present invention is adaptable to wiring substrate 35 even if it has the plurality of patterns 29 and 30 formed on only one of its surfaces 35c and 35d. Moreover, the present invention is also adaptable for any such wiring substrate that is provided with through-holes or the like for routing wiring patterns to one surface at only one side edge where it is connected to such as a connector.

What is claimed is:

1. A touch panel comprising:
   a first substrate of optical transparency having:
      a first surface;
      a first conductive layer formed at the first surface; and
      first electrodes formed in a manner to extend from two opposite sides of the first conductive layer;
   a second substrate of optical transparency having:
      a second surface;
      a second conductive layer formed at the second surface in a manner to confront the first surface with a space; and
      second electrodes formed in a manner to extend from two opposite sides of the second conductive layer in a direction orthogonal to the two opposite sides of the first conductive layer at which first electrodes formed;
   a wiring substrate having:
      a third surface;
      a fourth surface; and
      three or more wiring patterns formed on at least one of the third surface and the fourth surface; and
   an anisotropic conductive adhesive layer connecting a terminal portion of at least one of the wiring patterns to at least one of the first electrodes and the second electrodes,
   wherein spaces are provided between adjacent wiring patterns at an end of the wiring patterns, and a slit or an aperture is disposed at each of the spaces of the wiring patterns.

2. The touch panel of claim 1, wherein a number of the wiring patterns is four, and a number of the spaces and the slits or the apertures is three.

3. A touch panel comprising:
   a first substrate of optical transparency having:
      a first surface;
      a first conductive layer formed at the first surface;
      first electrodes formed in a manner to extend from two opposite sides of the first conductive layer; and
      first terminal portions connected to the first electrodes, respectively;
   a second substrate of optical transparency having:
      a second surface;
      a second conductive layer formed at the second surface in a manner to confront the first surface with a space;
      second electrodes formed in a manner to extend from two opposite sides of the second conductive layer in a direction orthogonal to the two opposite sides of the first conductive layer at which first electrodes formed; and
      second terminal portions connected to the second electrodes, respectively;
   a wiring substrate having:
      a third surface;
      a fourth surface; and
      a plurality of wiring patterns formed on at least one of the third surface and the fourth surface; and
   an anisotropic conductive adhesive layer connecting the wiring patterns to at least one of the first electrodes and the second electrodes, wherein:
   a first space is provided between adjacent first terminal portions at an end of the first terminal portions,
   a second space is provided between adjacent second terminal portions at an end of the second terminal portions, and
   a slit or an aperture is disposed at each of the first and second spaces.

4. The touch panel of claim 3, wherein a third space is provides between adjacent first and second terminal portions at an end of the first and second terminal portions, and a slit or an aperture is further disposed at the third space.

* * * * *